United States Patent
Wikström et al.

[19]

[11] Patent Number: 5,913,213
[45] Date of Patent: Jun. 15, 1999

[54] LINGERING LOCKS FOR REPLICATED DATA OBJECTS

[75] Inventors: Claes Wikström, Skärholmen; Håkan Mattsson, Tyresö, both of Sweden

[73] Assignee: Telefonaktiebolaget L M Ericsson, Stockholm, Sweden

[21] Appl. No.: 08/876,588

[22] Filed: Jun. 16, 1997

[51] Int. Cl.$^6$ .................................................. G06F 17/30
[52] U.S. Cl. ............................................................ 707/8
[58] Field of Search ........................ 707/8, 201; 711/141, 711/119–121, 145

[56] References Cited

U.S. PATENT DOCUMENTS

| | | | |
|---|---|---|---|
| 5,202,971 | 4/1993 | Henson et al. | 707/8 |
| 5,454,108 | 9/1995 | Devarakonda et al. | 395/674 |
| 5,537,645 | 7/1996 | Henson et al. | 395/650 |
| 5,551,046 | 8/1996 | Mohan et al. | 395/800 |
| 5,596,754 | 1/1997 | Lomet | 395/726 |
| 5,615,373 | 3/1997 | Ho | 395/726 |
| 5,682,537 | 10/1997 | Davies et al. | 395/726 |
| 5,692,178 | 11/1997 | Shaughnessy | 707/8 |
| 5,737,536 | 4/1998 | Herrmann et al. | 395/200.59 |
| 5,737,611 | 4/1998 | Vicik | 395/726 |
| 5,745,747 | 4/1998 | Chang et al. | 707/8 |

OTHER PUBLICATIONS

"Fine Granularity Locking to Support High Data Availability in Client/Server Database Management System", IBM Technical Disclosure Bulletin, vol. 38, No. 2, Feb. 1995, pp. 143–145.

Anonymous, "Device Fencing", IBM Technical Disclosure Bulletin, vol. 26, No. 3A, Aug. 1983, New York, U.S., p. 985.

*Primary Examiner*—Maria N. Von Buhr
*Attorney, Agent, or Firm*—Nixon & Vanderhye, P.C.

[57] ABSTRACT

In a network wherein replicas of a data object reside at a plurality of nodes, a node has a lock manager which handles requests for access to the data object by processes of differing nodes. When a process native to the node desires access to the data object, the lock manager sets a lingering lock flag in a lock table for the data object. Setting the lingering lock flag indicates that the data object can only be accessed at the node to the exclusion of processes of other nodes. The lingering lock flag can remain set after the process native to the node terminates access to the data object, thereby enabling a successive access to the data object by the same process or another process native to the node, such successive access being without notification to other nodes of the network.

12 Claims, 6 Drawing Sheets

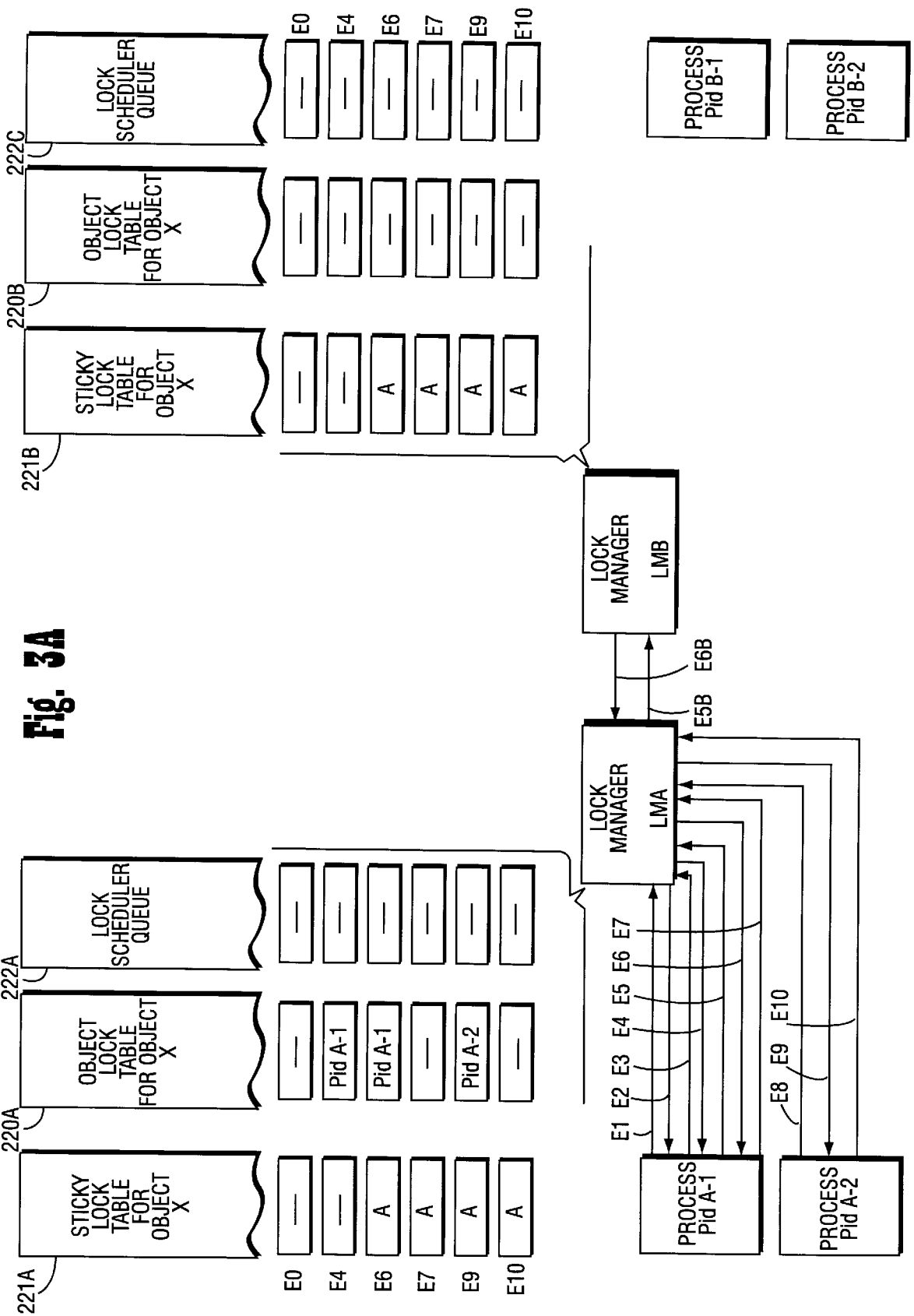

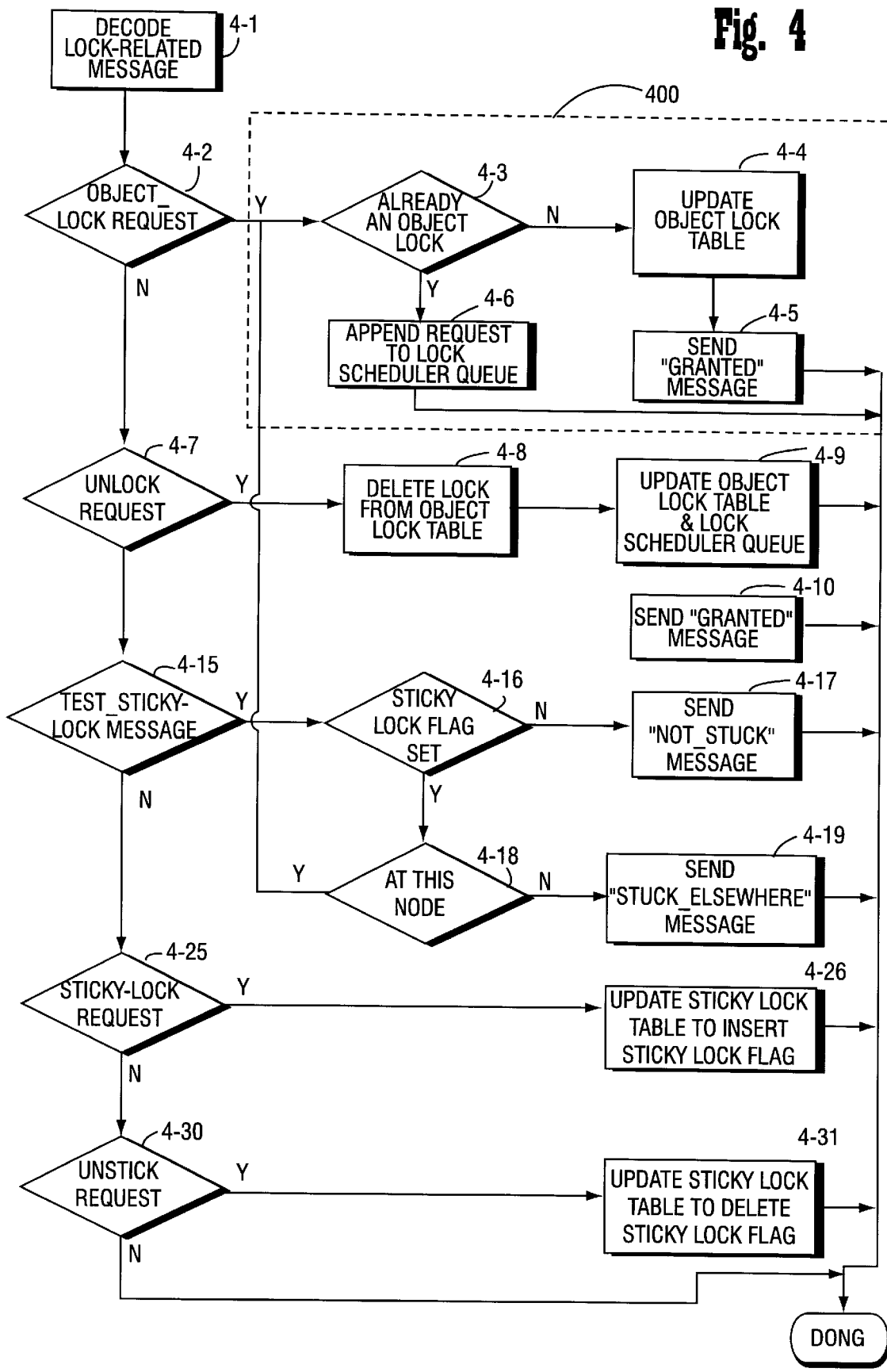

LINGERING LOCKS FOR REPLICATED DATA OBJECTS

This invention is related to that described in simultaneously-filed U.S. patent application Ser. No. 08/876,587, entitled "INITIALIZATION OF REPLICATED DATA OBJECTS", pending, which is incorporated herein by reference.

BACKGROUND

1. Field of Invention

This invention pertains to distributed or replicated databases, and particularly to the locking of access to data objects maintained by such databases.

2. Related Art and Other Considerations

When executing application programs, computers frequently assign and/or change values of data objects. In many instances the data objects are stored as part of a database. In more complex systems in which a plurality of computers are networked together, more than one computer may require access to a certain data object, and may change or update the value of that data object. To cater to such a multi-computer networked environment, a replicated database system can be established. In a replicated database system, each computer can maintain its own version of the database so long as all other computers are advised of the changes of a data object for maintaining consistency among the replicated databases.

Replicated databases have two primary advantages. A first advantage is fault tolerance. A second advantage is that local access to a replicated database is faster and less expensive than remote access to a database at another computer.

Each computer can have a plurality of application programs or processes accessing its local version of a replicated database. When a particular process needs to access a local version of the replicated database, a "lock" of the data object must be obtained by the accessing process in order to ensure exclusive access to the data object. Many so-called "concurrency control" algorithms or strategies use various forms of locking to achieve this goal.

The problem with locking of data objects in a network context is the increased effort and traffic occasioned by generating and handling lock-related messages between various nodes of the network. Consider, for example, a multi-node network which includes nodes N1 and N2, each having a computer which executes many processes and a local version of a replicated database in which resides data object Y. The computer of each node has a special purpose process known as a lock manager for administering the setting and releasing of locks for data objects including object Y. When a first process of node N1 desires access to data object Y, the computer of node N1, on behalf of the first process of node N1, sends a lock request message to the lock managers of all nodes of the network having data object Y in their versions of the replicated database. In response, each node in the network returns a lock status message to node N1, e.g., confirming (when appropriate) that data object Y is now locked at node N1. The first process of node N1 then can access and (when necessary) modify the value for data object Y. When the first process is finished with data object Y, the computer of node N1 on behalf of its first process sends a lock release message to all nodes. If a second process at node N1 then desires access to data object Y, essentially the same steps as described are executed, including issuance of the lock request message, collecting of response messages, and (upon completion of usage of data object Y) issuance of lock release messages.

Thus, repeated requests by processes at the same node for locking a data object can entail considerable message traffic over the network, as well as complicated lock bookkeeping by lock managers situated throughout the network. Various strategies to counter these undesirable ramifications have been developed, as explained, for example, by Bernstein, P. A., et al., *Concurrency Control and Recovery In Database Sytems*, Addison Wesley, 1987; and Özsu, T., Valduriez, P., *Principles of Distributed Database Systems*, Prentice Hall, 1991.

One strategy is merely to ignore the overhead associated with network input/output when setting locks on remote objects. A second strategy is to organize the data as having one primary copy and a set of secondary copies. With such organization, the secondary copies are not visible to the programs or processes accessing the data. The secondary copies are updated by the system whenever the primary copy is updated. The major disadvantage of this second strategy is that the system becomes static. All programs are forced to use the primary copy and, if the primary copy fails, or if for any reason one of the secondary copies wants to act as the primary copy, the system must be reconfigured.

A third strategy is to employ a loose or non-existent locking in which multiple copies can be updated simultaneously without prior locking. This third strategy works primarily in certain peculiar situation, e.g., when different operations on the same data object commute. For example, if an integer value is stored, and the only operation allowed on the data object is incrementation, i.e., a counter, locking is not necessary.

What is needed therefore, and an object of the present invention, is simplified method and apparatus for locking access to data objects of a database which is replicated across a network.

SUMMARY

In a network wherein replicas of a data object reside at a plurality of nodes, a node has a lock manager which handles requests for access to the data object by processes of differing nodes. When a process native to the node desires access to the data object, the lock manager sets a lingering lock flag in a lock table for the data object. Setting the lingering lock flag indicates that the data object can only be accessed at the node to the exclusion of processes of other nodes. The lingering lock flag can remain set after the process native to the node terminates access to the data object, thereby enabling a successive access to the data object by the same process or another process native to the node, such successive access being without notification to other nodes of the network.

The lingering lock flag is in addition to an object lock flag. When the process native to the node desires access to the data object, the lock manager also sets the object lock flag in the lock table for the data object. When the process native to the node terminates access to the data object, the lock manager clears the object lock flag.

The lock manager also handles a lock scheduling queue for the data object. When the lock manager receives a request from a non-native process from a second node relating to a desired access of the data object at the second node while the lingering lock flag is set for the data object in the lock table of the node, the lock manager can list the non-native process of the second node as requesting access to the data object in the lock scheduling queue.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is a schematic view of a series of data object accesses according to the present invention in a first scenario.

FIG. 4 is a flowchart showing steps executed by a lock manager process upon receipt of a lock-related message from another process.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
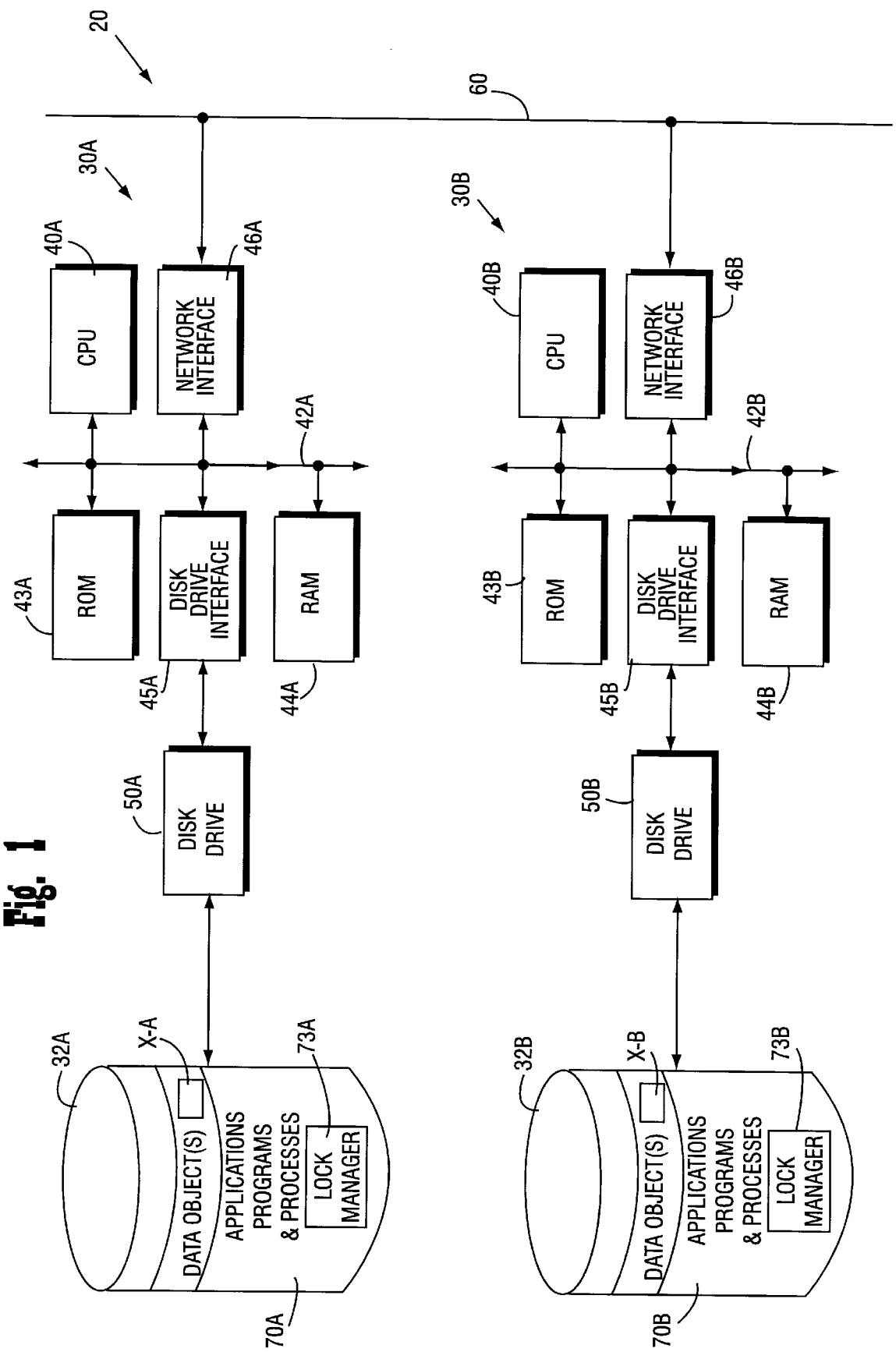
FIG. 1 is a schematic view of a network including two nodes whereat replicated data objects reside.

FIG. 1 shows a network 20 comprising two illustrative nodes 30A and 30B, also referenced separately as nodes "A" and "B" and generically as "node 30". Each node 30 has its own version of a data object X. Specifically, node 30A has hard disk 32A whereon its version of data object X, referenced as X-A, is stored. Similarly, node 30B has hard disk 32B whereon its version of data object X, referenced as X-B, is stored. As employed herein, "data object" can refer to a single data value, or to a collection or table of data values such as often occurs in a database. Each object (or group of objects) has its own object identifier, Oid.

Since versions of data object X are stored both at nodes 30A and 30B, when one node updates the value of data object X, the updated value is communicated to the other node so that the other node can likewise have the updated value, thereby maintaining a coordination of the value of the data object X.

Each node 30 includes a processor or CPU 40 which is connected by an internal bus 42 to numerous elements. Illustrated ones of the elements connected to internal bus 42 include a read only memory (ROM) 43; a random access memory (RAM) 44; a disk drive interface 45; and, a network interface 46. Disk drive interface 45 is connected to disk drive 50. Network interface 46 is connected to network link 60 over which the nodes 30A and 30B communicate.

Hard disk 32 is one example of a node-status inviolable memory or storage medium. By "node-status inviolable" is meant that the contents of the memory remain unaffected when the node crashes or assumes a "down" status. Although the node-status inviolable memory is illustrated in one embodiment as being a hard magnetic disk, it should be understood that other types of memory, e.g., optical disk, magnetic tape, etc., are also included.

Processor 40 executes a set of instructions in an operating system, which in turn allow processor 40 to execute various application programs or processes 70 which are preferably stored on hard disk 32. Of particular interest to the present invention is a set of instructions embodied in a computer product and known as a lock manager application program (LOCK MANAGER) 73. The effect of operation of lock manager application program (LOCK MANAGER) 73 is hereinafter described.

Figure 2:
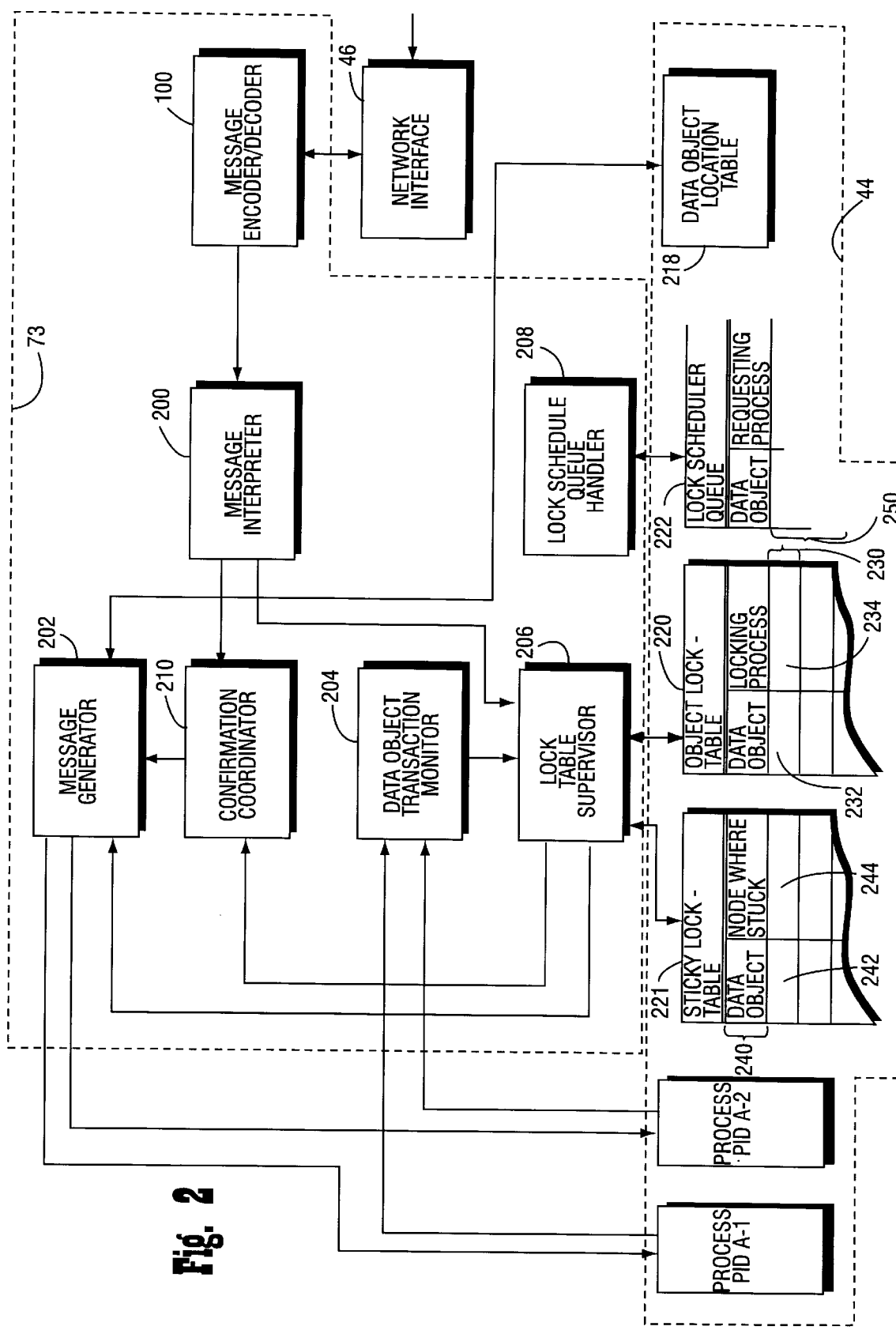
FIG. 2 is a schematic view of a node of the network of FIG. 1.

FIG. 2 shows node 30A in more detail and from a functional perspective. It will be understood that comparable structure and functionality also exists at other nodes of network 30, e.g., node 30B.

Processor 40A of node 30A is now described as being illustrative of processors of nodes throughout network 20. Processor 40A executes both application programs or processes 70 and the lock manager application program (LOCK MANAGER) 73. In order to be executed, such processes and programs must be loaded from the medium on which they are stored, e.g., hard disk 32, into RAM 44A, for which reason exemplary processes Pid A-1 and Pid A-2 are shown as enveloped by broken line 44A in FIG. 2.

Processor 40A of node 30A, when executing the lock manager application program (LOCK MANAGER) 73, performs the various functions enveloped by broken line 73 in FIG. 2. Such functions performed by the lock manager application program (LOCK MANAGER) 73 include those of message encoder/decoder 100, message interpreter 200, message generator 202, data object transaction monitor 204, lock table supervisor 206, lock schedule queue handler 208, and confirmation coordinator 210.

In addition to having instructions for the lock manager application program (LOCK MANAGER) 73 and processes Pid A-1 and Pid A-2, RAM 44A has stored therein data object location table 218; object lock table 220; sticky lock table 221; and, a set lock scheduler queue 222. Collectively, object lock table 220 and stickly lock table 221 are referenced herein as the "lock table".

As illustrated in FIG. 2, object lock table 220 has a record 230 for each data object pertinent to node A. Each record 230 has a field 232 which identifies the data object and a field 234 wherein is stored an object lock flag. The object lock flag is an identification of a particular process which has requested a lock on the data object.

Stickly lock table 221, also known as the lingering lock table, likewise has a record 240 for each data object entered therein. Each record 240 has a field 242 which identifies the data object and a field 244 wherein is stored a sticky lock flag, also known as the lingering lock flag. The value set for the sticky lock flag is the node where the sticky lock has been applied.

As also illustrated in FIG. 2, the lock scheduler queue 222 is comprised of a linked list of records 250. Each record 250 of queue 222 includes a field 252 which identifies the data object and a field 254 wherein is stored an identification of a requesting process, i.e., a process requesting a lock. As explained hereinafter, the lock scheduler queue 222 is essentially a first-come, first-serve listing of processes in this node or other nodes which request access to the data object which is the subject of the queue.

Operation of lock manager application program (LOCK MANAGER) 73 for node 30A, hereinafter simply referred to as the "lock manager LM", is understood in connection the flowchart of FIG. 4. Lock manager application program (LOCK MANAGER) 73 is a separate process, which performs the steps shown in FIG. 4 upon receipt of a lock-related message from another process executing at node 30A. The lock-related messages generated by a process can be one of five message types: [1] an "object_lock request" message (also known as a regular "lock request" message) having the format {stick, Oid, Node}; [2] an "unlock request" message having the format {unlock, Oid}; [3] a "test_sticky_lock" message having the format {test_sticky_lock, Pid, Oid}; [4] a "sticky_lock request" message having the format {stick, Oid, Node}; and, [5] an "unstick request" message having the format {unstick; Oid}. In each of the message formats, it is understood that the first parameter thereof pertains to the message type, that "Oid" refers to the data object identifier, that "Pid" refers to an identifier of the process sending the message; and that "Node" refers to a node of the network.

If, at step 4-2, the message is determined to be an "object_lock request" message, execution branches to a "try_lock" procedure which comprises steps framed by broken line 400 in FIG. 4 (i.e., steps 4-3 through 4-6). At step 4-3, the lock manager LM checks object lock table 220 to determine whether the data object identified in the message is already locked. If the data object is not already locked, at step 4-4 lock table supervisor 206 updates object lock table 220 by preparing a record 230, inserting therein the Oid of the request message in field 232 and setting the object lock flag by storing the Pid of the requesting process in field 234 of the record. Then, as indicated by step 4-5, the lock manager LM sends a "granted" message to the requesting process.

If, at step 4-3, it is determined that the message is already locked, at step 4-6 lock table supervisor 206 directs lock schedule queue handler 208 to append a record reflecting the request in lock scheduler queue 222. The record 250 entered into lock scheduler queue 222 identifies the data object and the process which requested the lock.

Should the message decoded be determined at step 4-7 to be an "unlock request" message, at step 4-8 the lock manager LM deletes the record for the data object identified in the "unlock request message" from the object lock table 220. Then, if there are any entries in the lock scheduler queue 222, lock table supervisor 206 working together with lock schedule queue handler 208, updates both object lock table 220 and lock scheduler queue 222. In this regard, at step 4-9 the highest priority lock request record in lock scheduler queue 222 is effectively transferred into object lock table 220, thereby enabling the awaiting process in queue 222 to place its lock. Then, at step 4-10, the lock manager LM sends a "granted" message to the process which has just been afforded the lock by the record transfer to object lock table 220.

Should the message decoded be determined at step 4-15 to be a "test_sticky_lock" message, at step 4-16 the lock manager LM determines whether a lock for the data object identified in the message has a stickly lock applied thereto. In particular, lock table supervisor 206 searches the sticky lock table 221 to determine if the Oid of the message has its lingering lock flag set, i.e., a sticky lock. The lingering lock flag is considered to be "set" when field 244 for the record for the Oid has a node value stored therein. If a lingering lock flag has not been set, at step 4-17 lock table supervisor 206 apprises message generator 202, and a "not_stuck" message is sent to the requesting process.

If it is determined at step 4-16 that a lingering lock flag has been set for the Oid of the "test_sticky lock" message, at step 4-18 lock table supervisor 206 determines whether the lingering lock flag is set by a process at this node or a process of another node. Such determination involves checking field 234 for the Oid of the message. If the lingering lock flag is set by a process at another node, message generator 202 is instructed to send a "stuck elsewhere" message to the process which sent the test sticky lock message (see step 4-19). If the lingering lock flag is set by a process at this node, the lock manager LM performs the "try_lock procedure" 400 above-described with reference to steps 4-3 through 4-6.

Should the message decoded be determined at step 4-25 to be a "sticky lock request" message, at step 4-26 the lock table supervisor 102 of the lock manager LM creates a record 240 in sticky lock table 221. In creating the record, lock table supervisor 220 inserts the Oid of the data object to be locked in field 242, and the node of the requesting process in field 244. Setting the node of the requesting process in field 244 amounts to setting the lingering lock flag, also known as the sticky lock flag, for the data object identified in the stickly lock request message.

Should the message decoded be determined at step 4-30 to be an "unstick request" message, at step 4-31 the lock table supervisor 102 of the lock manager LM deletes the record in stickly lock table 221 for the data object identified in the "unstick request" message. This amounts to clearing the lingering lock flag, also known as the sticky lock flag, for the data object identified in the "unstick request" message.

Figure 5:
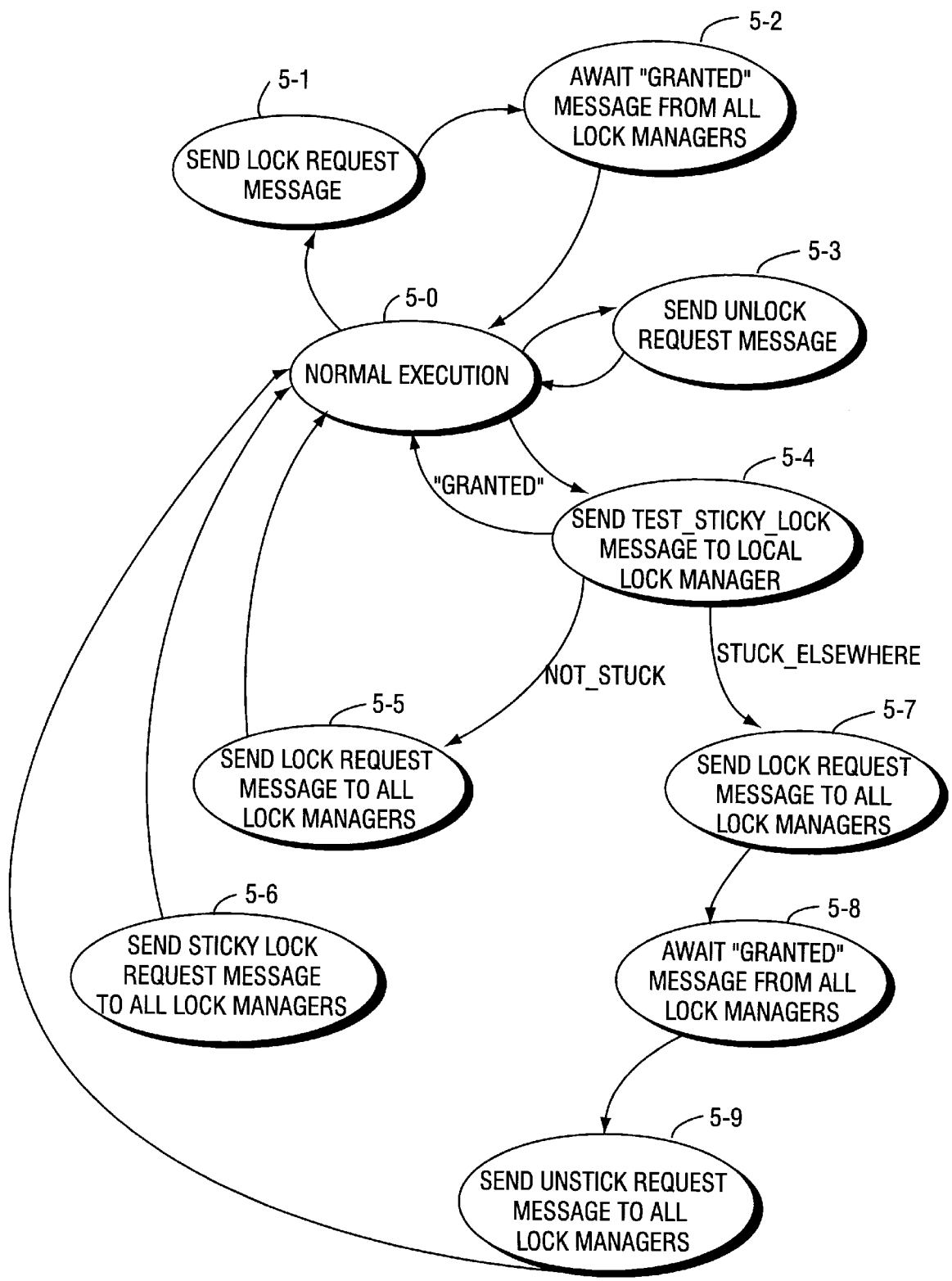
FIG. 5 is a state diagram showing states of a process which sends lock-related message to lock manager process(es).

Whereas FIG. 4 shows steps executed by the lock manager LM upon receipt of a lock-related message from another process, FIG. 5 shows states of a process, such as process Pid A-1, which sends lock-related message to lock manager process(es) [LMs]. State 5-0 depicts normal execution of the process. Various other states of FIG. 5 involve messages including those having formats discussed above in connection with FIG. 4.

State 5-1 reflects the process sending a "lock request" message to all lock managers (LMs). As indicated by state 5-2, execution by the process is suspended until a "granted" message is received from all lock managers. When the process desires to unlock a data object, an "unlock request" message is sent as depicted by state 5-3, without disrupting execution of the process.

State 5-4 depicts the process sending a "test_sticky_lock" message to its local lock manager. As described above with reference to FIG. 4, three possible responses may be received from the local lock manager. A first response may be a "granted" message (see step 4-5), which results when the sticky lock flag has already been set at this node. A second response is a "not_stuck" message (generated at step 4-17 of FIG. 4). A third response is a "stuck_elsewhere" message (generated at step 4-19 of FIG. 4).

Upon receipt of a "not_stuck" message, as indicated by state 5-5 the process sends a (object) "lock request" message to all lock managers. The "lock request" message is handled by the lock managers in accordance with the "try lock" procedure 400 (see FIG. 4). This results in a "granted" message being sent to the process. Then, as indicated by state 5-6 the process sends a "sticky lock request" message to all lock managers. All lock managers then update their sticky lock tables 221 to insert a sticky lock flag, as previously explained with reference to step 4-26.

Upon receipt of a "stuck_elsewhere" message, as indicated by state 5-7 the process sends a "lock request" message to all lock managers. The "lock request" messages are handled by the lock managers in accordance with the "try_lock" procedure 400 (see FIG. 4). State 5-8 shows the process awaiting receipt of a "granted" message from all lock managers. Upon receipt of a "granted" messages from all lock managers, the process sends either an "unstick request" message (states 5-9) to all lock managers.

Figure 3B:
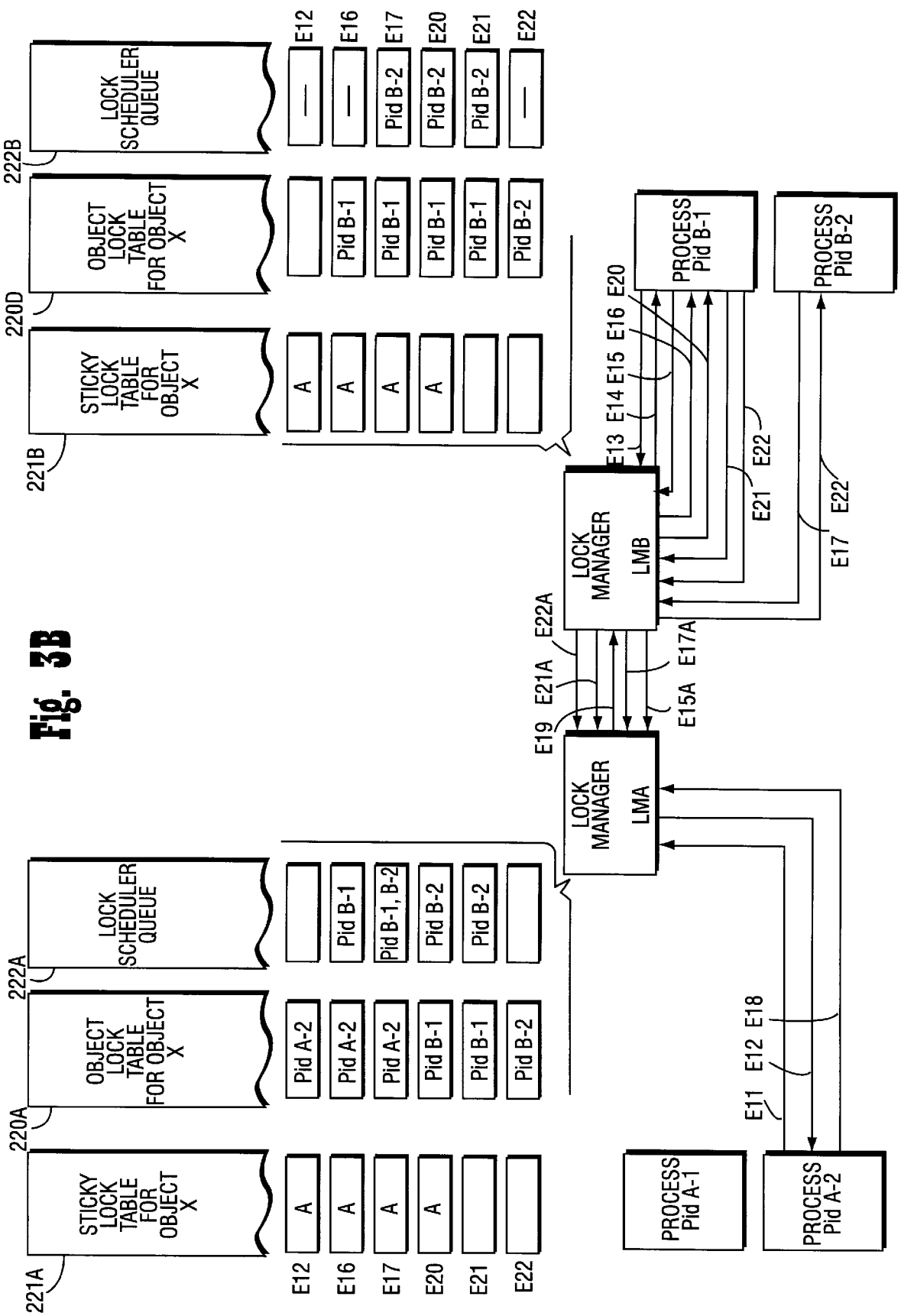
FIG. 3B is a schematic view of a series of data object accesses according to the present invention in a second scenario.

Operation of lock manager application program is illustrated in connection with various scenarios represented by FIG. 3A and FIG. 3B. For sake of simplicity, the nodes are illustrated primarily as including only lock managers, as well as various processes executed at those nodes (e.g., processes Pid A-1 and Pid A-2 at node 30A; processes Pid B-1 and Pid B-2 at node 30B). FIG. 3A and FIG. 3B also depict in simplified form the contents of object lock table 220, sticky (lingering) lock table 221, and lock scheduler queue 222, for each of the lock managers for the respective nodes. Only the portion of the contents of the lock tables relevant to data object X are shown, with such records of the lock tables being shown essentially in a time sequenced format.

As understood from the detailed discussion provided below, the present invention utilizes two types of lock flags. A first type of lock flag, known as the object lock flag, is set in the field 234 of the record 230 of object lock table 220 for the respective data object as the object lock flag. A second type of lock flag, known as the lingering lock flag or "sticky lock" flag, is set in the manner hereinafter described in field 236 of the record 240 of sticky lock table 221 for the respective data object.

In FIG. 3A, it is assumed that initially (event E0) no node has set a lingering lock flag for data object X. Nor has any process set an object lock with respect to data object X. FIG. 3A shows depiction of contents of each of the object lock flag, sticky lock flag, and scheduler queue 222 at various event times hereinafter noted. Initially, i.e., at event E0, no lock flag has been set and the scheduler queue is empty.

However, process Pid A-1 desires to set a sticky lock flag. To do so, and as indicated by event El of FIG. 3A, process Pid A-1 sends a "test_sticky_lock" message to its local lock manager LMA (state 5-4 of FIG. 5). The data object transaction monitor 204 of the local lock manager LMA detects such message (step 4-15) and sends a command for lock table supervisor 206 to analyze its sticky lock table 221. In the present scenario, the lock table supervisor determines (step 4-16) that no sticky lock flags have been set for data object X. In accordance with such determination, lock table supervisor 206 sends a command to message generator 202, the command having a command type that causes generator 202 to send a "not_stuck" message to process Pid A-1 as event E2 (see step 4-17).

Upon receipt of the "not_stuck" message from lock manager LMA, process Pid A-1 requests locking of data object X by sending a "lock request" message to its local lock manager (event E3, state 5—5). When data object transaction monitor 204 of the local lock manager determines that process Pid A-1 has requested a lock, a command is sent to lock table supervisor 206 and to message generator 202. In response, lock table supervisor 206 sets both the object lock flag in field 234 of object lock table 220 (step 4—4). In addition, message generator 202 prepares a "granted" message which is sent as event E4 to process Pid A-1 (step 4-5). FIG. 3A shows the object lock flag set at event E4.

Upon receipt of the "granted" message, process Pid A-1 acquires state 5-6 in which a "sticky lock request" message is sent to the lock managers of each of the nodes whereat data object X is replicated. Event E5 shows the "sticky lock request" message being sent first to the local lock manager LMA. The local lock manager LMA accesses data object location table 218 in order to determine what other nodes of network 20 have the data object X at replicated databases. Upon consultation of data object location table 218, message generator 202 directs message encoder/decoder 100 to prepare a message (which is applied to network link 60 by network interface 46A) requesting that other nodes also lock the data object. In the present illustration, node B also has data object X, for which reason event E5B shows a network lock message being transmitted to lock manager LMB of node B.

Upon receipt of the "sticky lock request" message, the lock managers of nodes A and B prepare a record in their respective sticky lock tables 221A, 221B for data object X, and set the sticky lock flag by storing an indication of node A in field 244 of such records in accordance with step 4-26. When lock table supervisor 206 sets the object lock flag to "Pid A-1" and the lingering lock flag to "A", lock table supervisor 206 sends a confirmation message to confirmation coordinator 210. Likewise, the lock manager LMB for node B sends a "sticky lock confirmation message" over the network to node A (see event 6B). At node A, the lock confirmation message from node B is decoded by message encoder/decoder 100 and applied to message interpreter 200. Upon discerning that the message is a lock confirmation message, message interpreter 200 forwards the confirmation to confirmation coordinator 210. Noting confirmation from both lock table supervisor 206 of node A and from all other nodes whereat data object X is replicated, confirmation coordinator 210 authorizes message generator 202 to send a "sticky lock confirmation" message to process Pid A-1 as event E6. FIG. 3B show that, by completion of event E6, the sticky lock flags have been set in both sticky lock table 221A of node A and sticky lock table 221B of node B.

Upon receipt of the "sticky lock confirmation" message, process Pid A-1 is qualified to access data object X, to the exclusion of all other processes both at node A and any other nodes.

When process Pid A-1 is finished with data object X, in the particular scenario illustrated in FIG. 3A the Pid A-1 enters state 5-3 and sends an "unlock request" message as event E7 to its local lock manager LMA. Upon receipt of the "unlock request" message, lock manager commands the lock table supervisor 206 to delete the object lock flag from object lock table 220 (step 4-8). The lingering lock flag remains set at the time of event E7 as shown in FIG. 3A.

Of course, upon release of data object X by process Pid A-1, other nodes of the network having a replication of data object X are sent messages enabling those other nodes to update their local versions of data object X in accordance with the value(s) assigned or modified by process Pid A-1. However, the lock tables for such other nodes remain unchanged. That is, there is no network message to other nodes of the network reflecting a change of lock status.

FIG. 3A further illustrates that, after release of data object X by process Pid A-1, process Pid A-2 desires access to data object X and enters state 5-1 to send as event E8 a "lock request" message to lock manager LMA of node A. The requested access for data object X is detected by data object transaction monitor 204, and a command sent to lock table supervisor 206. Lock table supervisor 206 determines that the object lock flag is not set (step 4-3). Such being the case, lock table supervisor 206 sets the object lock flag in field 234 to indicate process Pid A-2, and as event E9 the lock manager LMA sends a "granted" confirmation message (step 4-5) to process Pid A-2. FIG. 3A shows, for event E8, the object lock flag of node A being set to indicate process Pid A-2.

Upon receipt of the "granted" message of event E9, process Pid A-2 is able exclusively to access and modify data object X, in like manner as done by process Pid A-1 previously. When process Pid A-2 releases access to data object X (see event E1O), a similar procedure as above described with respect to event E7 occurs. Included in such procedure is lock table supervisor 206 clearing the object lock flag in field 234 of object lock table 220. Again, the lingering lock flag in field 244 is not cleared in the lingering lock table of any node.

From the foregoing it can be seen that setting of the lingering lock flag, also known as the sticky lock flag, expedited access by process Pid A-2 to data object X. Whereas, in the prior art, further network messages would be necessary in order for process Pid A-2 to claim exclusive access to data object X and to receive confirmation of such exclusive access, such further network messages are obviated in the present invention. In other words, once a lingering lock flag has been set for a node, the lingering lock flag remains stuck at that node (until removed by operations subsequently described herein). The sticking of the lingering lock flag enables the data object to be accessed repeatedly by the same process at such node, or by other processes of that node, without issuance and reception of network messages such as lock request and lock confirmation network messages. The lingering lock flag and its employment as described herein thus advantageously curtails network traffic in situations in which a same node has process(es) which make successive access to the same data object.

FIG. 3B illustrates another scenario in which process Pid A-2 of node A has requested access and received lock confirmation with respect to data object X, with the lingering lock flag having previously been set for node A in the manner described above with respect to FIG. 3A. In essence, event E11 and event E12 of FIG. 3B correspond to events E8 and E9, respectively, of FIG. 3A. Accordingly, at event E12 the object lock flag is set to indicate process Pid A-2 and the lingering lock flag remains set for node A. Likewise, as understood from the foregoing discussion of FIG. 3A, the lingering lock flag for node B remains set as shown to indicate that the lingering lock is at node A.

In the scenario of FIG. 3B, however, process Pid B-1 of node B enters state 5-4 and requests access to its local version of data object X while process Pid A-2 is still utilizing data object A. The request is in the form of a "test_sticky_lock" message which is sent as event E13. Upon determining that the lingering lock is set in its sticky lock table 221B to indicate node A (steps 4-16 and 4-18), the lock table supervisor 206 of lock manager LMB causes its message generator 202 to send (as event E14) a "stuck_elsewhere" message (step 4-19) to process Pid B-1.

Upon receipt of the "stuck_elsewhere" message, process Pid B-1 enters state 5-7 and as event E15 sends a "lock request" message to lock managers at all nodes whereat data object X resides. As explained initially, process Pid B-1 initially sends the "lock request" message to its local lock manager, and the local lock manager sends the lock request manager to other nodes as indicated by event E15A.

After sending the "lock request" message of state 5-7, process Pid B-1 assumes state 5-8 and awaits a "granted" message from each node whereat data object X resides in a replicated data base.

Upon receipt of the "lock request" message, lock manager LMB checks its object lock table 220B. Failing to find any indication of an object lock (step 4-3), lock manager LMB updates it object lock table 220B whereby its object lock flag shows process Pid B-1 as having the object lock (step 4—4). Then, lock manager LMB causes its message generator 202 to send a "granted" message (step 4-5) to process Pid B-1 as event E16.

Upon receipt of the "lock request" message, lock manager LMA also checks its object lock table 220A, and finds (at step 4-3) that local process Pid A-2 still has the object lock. At this point, lock manager LMA cannot relinquish the lock on data object X. Rather, lock manager LMA instructs its lock schedule queue handler 208 to store, in its lock scheduler queue 222A, an indication that process Pid B-1 of node desires access to data object X.

Process Pid B-1 thus remains suspended in state 5—5, awaiting receipt of a "granted" message from all nodes. The "granted" message has thus far been received only from its own local lock manager LMB; a "granted" message is still lacking from node A.

It so happens in the scenario of FIG. 3B that process Pid B-2 then also requests access to data object X. In particular, upon assuming state 5-1 the process Pid B-2 sends an object "lock request" message as event E16 to lock managers at all nodes where data object X resides. As explained previously, the object "lock request" message is initially sent to local lock manager LMB (event E17), which prepares a network message for sending of the object "lock request" message to other nodes (event E17A).

At this juncture process Pid A-2 is still utilizing data object X, and process Pid B-1 preceded process Pid B-2 in requesting access to data object X.

Upon receipt of the object "lock request" message of event E17 for access to data object X by process Pid B-2, lock manager LMB notes from its object lock table 220B that process Pid B-1 has the object lock flag set in field 234 (step 4-3). Such being the case, at step 4-6 the lock manager LMB has its lock schedule queue handler 208 store in queue 222B an indication that process Pid B-2 next desires access to data object X. Process Pid B-2 must then assume state 5-2 of awaiting a yet-issued "granted" message from all nodes whereat data object X is replicated. A similar activity occurs at node A, whereat in accordance with steps 4-3 and 4—4 the process Pid B-2 is added to lock scheduler queue 222A.

Eventually process Pid A-2 finishes with data object X. Process Pid A-2 assumes state 5-3 and sends an "unlock request" message to its local lock manager LMA, as indicated by event E18 of FIG. 3B. Upon receipt of the "unlock request" message, lock manager LMA deletes the indication of process Pid A-2 from its object lock table 220A (step 4-8). Moreover, as indicated by step 4-9, lock manager LMA transfers the record in its lock scheduler queue 222A which refers to process Pid B-1 to its object lock table 220A, setting the object lock flag in field 234 of the record for object X to indicate process Pid B-1. Then, as step 4-10, lock manager LMA sends as event E19 a "granted" message to node B, specifically indicating that the lock request (event E15) of process Pid B-1 has been granted. Event E20 shows the "granted" message being conveyed by lock manager LMB to process Pid B-1.

Upon receipt of the "granted message", process Pid B-1 can, at last, enter state 5-9A. In state 5-9A, process Pid B-1 sends a "sticky lock request" message to lock managers at all nodes whereat data object X resides in replicated databases. Initially the "sticky lock request" message is sent to local lock manager LMB (event E21), which sends a network message (event E21A) to other nodes. As shown associated with event E21 in FIG. 3B, the lingering lock flag has been changed.

Process Pid B-1 can then obtain access to object X. When process Pid B-1 assumes state 5-3 to release access to data object X (as understood from earlier discussions), an "unlock request" message is sent as event E22 to lock managers at all nodes whereat data object X resides. The lock table supervisor of lock manager LMB clears the object lock flag from field 234 of lock table 220B (step 4-8). After the object lock flag is cleared, lock manager LMB causes its lock schedule queue handler 208 to determine whether any process or node listed in lock schedule queue 222 of node B has requested access to data object X. In the present case, it is noted from queue 222B that process Pid B-2 has made such request, as above mentioned. Accordingly, lock manager LMB causes its lock table supervisor 206 to set the object lock flag in field 234 to indicate that process Pid B-2 now has the lock on data object X (step 4-9). The reference to process Pid B-2 is then removed from the lock scheduler queue 222B of lock manager LMB (step 4-9). Then, at step 4-10 lock manager LMB sends a "granted" message to process Pid B-2 as event E21. The "granted" message of event E22 is responsive to the "lock request" message of event E17 from process Pid B-2.

Although not shown as such in FIG. 3B but understood with respect to the steps of FIG. 4, the events of the preceding paragraph also occur for lock manager LMA of node A. As a result, the lock scheduler queue 222A of node A is also cleared, and the object lock flag in field 232 for object X is set in object lock table 220 to refer to process Pid B-2.

Although for simplicity the invention has been described above in terms of a network 20 including two nodes, i.e., nodes 30A and 30B, it will be readily appreciated that the invention is readily applicable to networks having a greater number of nodes. Moreover, it should be understood that only messages necessary for illustrating the current invention have been illustrated, and that other types of messages including confirmation messages are not illustrated.

There is the possibility that dead locks can occur during some scenarios of implementation of the present invention. A dead lock exists when two or more processes are waiting for each other forever. In a dead lock, two processes can end up in waiting queues. Dead lock situations can be remedied by any number of well known techniques, such as the WAIT-DIE algorithm as documented by Rosenkrantz, D. J., Stearns, R. E., and Lewis, P. M., "System Level Concurrency Control for Distributed Database Systems", *ACM Transactions, Database Systems*, 3(2): 178–179, June 1978.

While the invention has been particularly shown and described with reference to the preferred embodiments thereof, it will be understood by those skilled in the art that various alterations in form and detail may be made therein without departing from the spirit and scope of the invention. For example, it should be understood that both the sticky lock flag and the object lock flag for a data object can be maintained in a single table, as opposed to two separate tables as shown in the specifically illustrated embodiments.

The embodiments of the invention in which an exclusive property or privilege is claimed are defined as follows:

1. A node of a computer network, the node comprising:
    a memory in which a data object is stored, the data object being replicated at another node of the network whereby the data object is maintained at plural nodes and updated at each of the plural nodes when the data object is changed by any one of the plural nodes;
    a lock table which indicates whether (1) the data object is already locked at the node; (2) the data object is locked at the another node, the lock table further specifying an identification of the another node; (3) the data object is unlocked; and
    a processor having a lock manager which, when a process native to the node desires access to the data object, checks the lock table and,
        if the data object is already locked at the node, posts the lock-requesting process in a lock scheduler queue for the data object;
        if the data object is locked at the another node, on behalf of the lock-requesting process sends to the another node a request for a lock on the data object;
        if the data object is unlocked, (a) sets a lingering lock flag in the lock table for the data object to indicate that the data object can only be accessed at the node to the exclusion of processes of other nodes, (b) grants the process access to the data object as stored in the memory of the node, (c) sends a signal to the another node notifying the another node that the data object is locked at the node, the lingering lock flag remaining set after the process native to the node terminates access to the data object, thereby enabling a successive access to the data object by the process native to the node or another process native to the node without further notifying the another node of the network.

2. The apparatus of claim 1, wherein when the process native to the node desires access to the data object, the lock manager sets an object lock flag in the lock table for the data object, and when the process native to the node terminates access to the data object, the lock manager clears the object lock flag.

3. The apparatus of claim 1, wherein when the lock manager receives a request from a non-native process from the another node relating to a desired access of the data object at the another node while the lingering lock flag is set for the data object in the lock table of the node, the lock manager lists the non-native process of the another node as requesting access to the data object in the lock scheduling queue.

4. A computer product comprising a set of programmed instructions stored in a program memory, the set of instructions upon being executed by a processor of a node of a network, performing the steps of:
    (1) determining when a process native to the node desires access to a data object, the data object being replicated in another node of the network whereby the data object is maintained at plural nodes and updated at each of the plural nodes when the data object is changed by any one of the plural nodes;
    (2) in accordance with step (1), checking a lock table stored at the node to determine whether (i) the data object is already locked at the node; (ii) the data object is locked at the another node, the lock table further specifying an identification of the another node; or (iii) the data object is unlocked;
    (3) if the data object is already locked at the node, posting the process in a lock scheduler queue stored at the node for the data object;
    (4) if the data object is locked at the another node, and on behalf of the process, sending a request from the node to the another node for a lock on the data object;
    (5) if the data object is unlocked,
        (a) setting a lingering lock flag in the lock table of the node for the data object to indicate that the data object can only be accessed at the node to the exclusion of processes of other nodes;

(b) granting the process access to the data object as stored in the memory of the node;

(c) sending a signal to the another node notifying the another node that the data object is locked at the node, and then (d) maintaining the lingering lock flag set after the process native to the node terminates access to the data object, thereby enabling a successive access to the data object by the process native to the node or another process native to the node without further notifying the another node of the network.

5. The product of claim 4, further comprising:

setting an object lock flag in the lock table for the data object when the process native to the node desires access to the data object;

clearing the object lock flag when the process native to the node terminates access to the data object.

6. The product of claim 5, further comprising:

listing a process of the another node as requesting access to the data object in the lock scheduling queue, when a request is received from the process of the another node relating to a desired access of the data object at the another node while the lingering lock flag is set for the data object in the lock table of the node.

7. A method of regulating access to a data object replicated across a plurality of nodes of a network and wherein the data object is maintained at plural nodes and updated at each of the plural nodes when the data object is changed by any one of the plural nodes, the method comprising:

maintaining a lock table for the data object at each of the plurality of nodes of the network, at each node the lock table indicating from the perspective of the respective node whether (i) the data object is already locked at the node; (ii) the data object is locked at another node, the lock table further specifying an identification of the another node; or (iii) the data object is unlocked;

when a process native to a node desires access to the data object, checking the lock table stored at the node; and if the data object is already locked at the node, posting the process in a lock scheduler queue stored at the node for the data object;

if the data object is locked at the another node, and on behalf of the process, sending a request from the node to the another node for a lock on the data object;

if the data object is unlocked, (a) setting a lingering lock flag in a lock table for the data object to indicate that the data object can only be accessed at the node to the exclusion of processes of other nodes;

(b) granting the process access to the data object as stored in the memory of the node;

(c) sending a signal to the another node notifying the another node that the data object is locked at the node, and then (d) maintaining the lingering lock flag set after the process native to the node terminates access to the data object, thereby enabling a successive access to the data object by the process native to the node or another process native to the node without further notifying other nodes of the network.

8. The method of claim 7, further comprising:

setting an object lock flag in the lock table of the node for the data object when the process native to the node desires access to the data object; and clearing the object lock flag when the process native to the node terminates access to the data object.

9. The method of claim 8, further comprising listing a process of a second node as requesting access to the data object in the lock scheduling queue of the node, when a request is received at the node from the process of the second node relating to a desired access of the data object at the second node while the lingering lock flag is set for the data object in the lock table of the node.

10. A computer network having plural nodes, each of the plural nodes comprising:

a memory in which a data object is stored, the data object being replicated at each of the plural nodes of the network whereby the data object is maintained at each of the plural nodes and updated at each of the plural nodes when the data object is changed by any one of the plural nodes;

a lock table which indicates whether (i) the data object is already locked at the node; (ii) the data object is locked at another node, the lock table further specifying an identification of the another node; or (iii) the data object is unlocked; and;

a processor having a lock manager which, when a lock-requesting process native to the node desires access to the data object, checks the lock table and, if the data object is already locked at the node, posts the lock-requesting process in a lock scheduler queue for the data object;

if the data object is locked at the another node, on behalf of the lock-requesting process sends to the another node a request for a lock on the data object;

if the data object is unlocked, (a) sets a lingering lock flag in the lock table for the data object to indicate that the data object can only be accessed at the node to the exclusion of processes of other nodes, (b) grants the process access to the data object as stored in the memory of the node, (c) sends a signal to the another node notifying the another node that the data object is locked at the node, the lingering lock flag remaining set after the process native to the node terminates access to the data object, thereby enabling a successive access to the data object by the process native to the node or another process native to the node without further notifying the another node of the network.

11. The apparatus of claim 10, wherein when the process native to the node desires access to the data object, the lock manager sets an object lock flag in the lock table for the data object, and when the process native to the node terminates access to the data object, the lock manager clears the object lock flag.

12. The apparatus of claim 10, wherein when the lock manager receives a request from a non-native process from the another node relating to a desired access of the data object at the another node while the lingering lock flag is set for the data object in the lock table of the node, the lock manager lists the non-native process of the another node as requesting access to the data object in the lock scheduling queue.

* * * * *